US008730065B2

(12) United States Patent
Herman et al.

(10) Patent No.: US 8,730,065 B2
(45) Date of Patent: May 20, 2014

(54) SYSTEM AND METHOD FOR TACTILE PRESENTATION OF INFORMATION

(75) Inventors: Carl R. Herman, Owego, NY (US); Jason C. Twedt, Waverly, NY (US); Jean-Francois Darcy, Pittsford, NY (US); Steven D. Colby, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 107 days.

(21) Appl. No.: 13/427,425

(22) Filed: Mar. 22, 2012

(65) Prior Publication Data

US 2013/0249262 A1 Sep. 26, 2013

(51) Int. Cl.
*G08B 21/00* (2006.01)
*H04B 3/36* (2006.01)
*G08B 23/00* (2006.01)

(52) U.S. Cl.
USPC ......... 340/945; 340/965; 340/7.6; 340/407.1; 434/113; 434/114

(58) Field of Classification Search
USPC ................................ 340/945, 965, 407.1, 7.6
See application file for complete search history.

(56) References Cited

U.S. PATENT DOCUMENTS

| | | | |
|---|---|---|---|
| 1,941,533 | A | 1/1934 | Bennett |
| 3,157,853 | A | 11/1964 | Hirsch |
| 3,902,687 | A | 9/1975 | Hightower |
| 4,008,456 | A | 2/1977 | Ewart |
| 4,484,191 | A | 11/1984 | Vavra |
| 4,713,651 | A | 12/1987 | Morag |
| 6,002,349 | A | 12/1999 | Greene et al. |
| 6,087,942 | A | 7/2000 | Sleichter, III et al. |
| 6,273,371 | B1 | 8/2001 | Testi |
| 6,452,510 | B1 | 9/2002 | Zysko |
| 6,608,568 | B1 | 8/2003 | Ruchti |
| 6,695,264 | B2 | 2/2004 | Schaeffer et al. |
| 6,744,370 | B1 | 6/2004 | Sleichter, III et al. |
| 7,126,496 | B2 | 10/2006 | Greene |
| 7,132,928 | B2 | 11/2006 | Perricone |
| 7,167,781 | B2 | 1/2007 | Lee |

(Continued)

FOREIGN PATENT DOCUMENTS

| | | |
|---|---|---|
| EP | 2280381 A2 | 2/2011 |

OTHER PUBLICATIONS

International Search Report for International Application No. PCT/US2013/033481, mailed Jun. 11, 2013.

(Continued)

*Primary Examiner* — Donnie Crosland
(74) *Attorney, Agent, or Firm* — Wolf, Greenfield & Sacks, P.C.

(57) ABSTRACT

A system for tactile presentation of information to a pilot of an aircraft. The system comprises a pilot seat, a plurality of tactors, and a controller configured to control the plurality of tactors to tactually present the threat information to the pilot by producing one or more tactile stimuli based on situational awareness information. The tactors in the plurality of tactors are physically coupled to the pilot seat and the threat information is indicative of a threat to the aircraft. In some embodiments, at least one pressure sensor may be physically coupled to the pilot seat and the plurality of tactors may be configured to tactually present the threat information to the pilot based at least in part on data obtained by the at least one pressure sensor.

20 Claims, 5 Drawing Sheets

(56) References Cited

U.S. PATENT DOCUMENTS

| | | | |
|---|---|---|---|
| 7,245,231 | B2 | 7/2007 | Kiefer et al. |
| 7,262,712 | B2 | 8/2007 | Greene |
| 7,271,707 | B2 * | 9/2007 | Gonzales .................. 340/407.1 |
| 7,369,042 | B2 | 5/2008 | Osaka et al. |
| 2002/0145512 | A1 | 10/2002 | Sleichter, III et al. |
| 2003/0094539 | A1 | 5/2003 | Schaeffer et al. |
| 2005/0073439 | A1 | 4/2005 | Perricone |
| 2005/0225456 | A1 | 10/2005 | Greene |
| 2005/0258977 | A1 | 11/2005 | Kiefer et al. |
| 2005/0273263 | A1 | 12/2005 | Egami et al. |
| 2005/0278088 | A1 | 12/2005 | Thorner |
| 2006/0071817 | A1 | 4/2006 | Greene |
| 2007/0043505 | A1 | 2/2007 | Leicht |
| 2007/0060045 | A1 | 3/2007 | Prautzsch |
| 2007/0109104 | A1 | 5/2007 | Altan et al. |
| 2007/0244641 | A1 | 10/2007 | Altan et al. |
| 2007/0290535 | A1 | 12/2007 | Meredith et al. |
| 2008/0010004 | A1 | 1/2008 | Small et al. |
| 2008/0023951 | A1 | 1/2008 | Al-Samarae et al. |
| 2008/0100476 | A1 | 5/2008 | Kim |
| 2008/0174415 | A1 | 7/2008 | Tanida et al. |
| 2008/0174451 | A1 | 7/2008 | Harrington et al. |
| 2008/0211645 | A1 | 9/2008 | Mathes |
| 2008/0306666 | A1 | 12/2008 | Zeng et al. |
| 2009/0032590 | A1 | 2/2009 | Hopkins |
| 2010/0194598 | A1 | 8/2010 | Trautenberg |

OTHER PUBLICATIONS

Written Opinion for International Application No. PCT/US2013/033481, mailed Jun. 11, 2013.

* cited by examiner

SYSTEM AND METHOD FOR TACTILE PRESENTATION OF INFORMATION

FIELD OF INVENTION

The techniques described herein are directed generally to the field of presenting information, and more particularly to techniques for tactile presentation of information.

BACKGROUND

Aircraft pilots must assimilate and prioritize a large amount of information being presented to them during flight. A pilot may be presented with many types of information such as navigational information, information about the aircraft, threat information about any potential threats to the aircraft, mission status information, and many other types of information. The information may be presented using one or more types of interfaces such as audio interfaces and/or visual interfaces such that information may be presented using audio cues and/or visual cues.

It is challenging for a pilot of any aircraft to process all the information presented to the pilot, let alone to process the information while performing other tasks such as controlling the aircraft and/or communicating with one or more other parties (e.g., mission control). As a result, pilots are often inundated with information being presented to them and are unable to adequately process it. In turn, this leads to pilot confusion and delays the pilot in making important and/or time-sensitive decisions.

One conventional approach for addressing this problem of information-overload has been to present pilots with information by using other types of interfaces instead of or addition to using audio and/or visual interfaces. Some techniques involve relying on a pilot's sense of touch to present him with information. To this end, a pilot may be outfitted to wear one or more devices, referred to as "tactors," that are configured to tactually stimulate the pilot to present him with information such as navigational information. The tactors may be provided as part of any suitable wearable article such as a pilot's suit, a vest, gloves, etc. For example, a pilot may be provided with gloves containing tactors. The tactors in the glove may stimulate the outside of the pilot's right hand to indicate that the pilot should move the hand to the left and may stimulate the inside of the right hand may indicate the pilot should move the hand to the right. The tactors in the glove may stimulate the top/bottom of the pilot's wrist to indicate that the pilot should move the stick forward/aft. The left glove's top and bottom tactors can stimulate the pilot's hand to indicate that the pilot should move the power control up/down or forward/backward.

SUMMARY

Accordingly, in some embodiments, a method for tactile presentation of threat information to a pilot of an aircraft is disclosed. The method comprises tactually presenting the threat information to the pilot by controlling a plurality of tactors to produce one or more tactile stimuli based on situational awareness information, wherein tactors in the plurality of tactors are physically coupled to a pilot seat in the aircraft and the threat information is indicative of a threat to the aircraft.

In some embodiments, a system for tactile presentation of threat information to a pilot of an aircraft is disclosed. The system comprises a pilot seat, a plurality of tactors, and a controller configured to control the plurality of tactors to tactually present the threat information to the pilot by producing one or more tactile stimuli based on situational awareness information, wherein the tactors in the plurality of tactors are physically coupled to the pilot seat and the threat information is indicative of a threat to the aircraft.

In some embodiments, a pilot seat in an aircraft is disclosed. The pilot seat comprises a plurality of tactors, a seating portion physically coupled to at least one pressure sensor; and wherein the plurality of tactors are configured to tactually present information to a pilot of the aircraft by producing one or more tactile stimuli based at least in part on data obtained by the at least one pressure sensor.

The foregoing is a non-limiting summary of the invention, which is defined by the attached claims.

BRIEF DESCRIPTION OF DRAWINGS

The accompanying drawings are not intended to be drawn to scale. For purposes of clarity, not every component may be labeled in every drawing. In the drawings.

DETAILED DESCRIPTION

Figure 1:
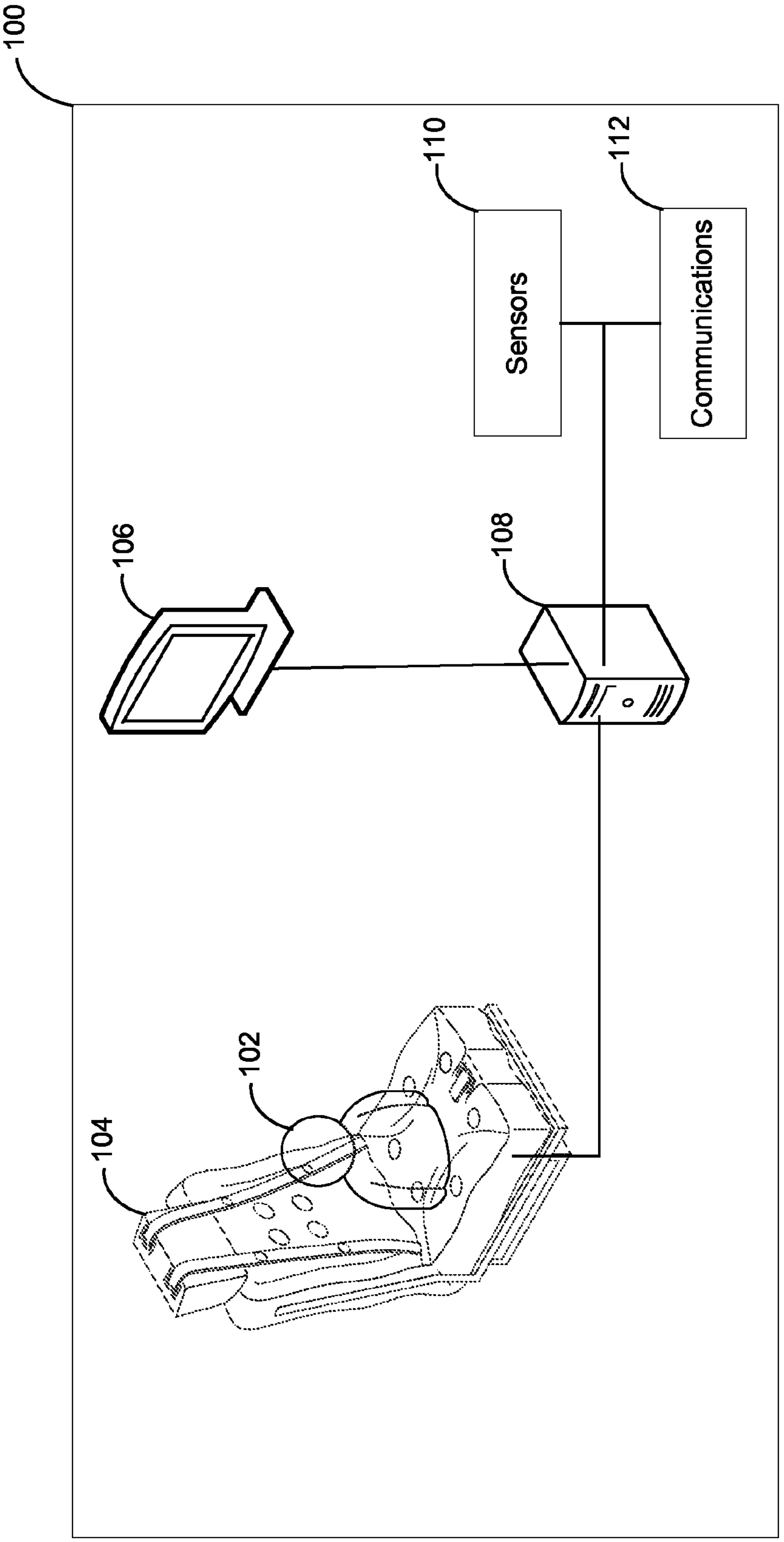
FIG. 1 shows an illustrative environment in which some embodiments of the present invention may operate.

The inventors have recognized and appreciated that conventional approaches to providing information to pilots by relying on their sense of touch are expensive and inconvenient. In particular, the inventors have recognized that outfitting pilots with wearable tactors is expensive because each pilot would have to be individually outfitted with the tactors. For example, if pilots were outfitted with vests or suits comprising tactors, the vests or suits would need to be tailored and fitted to each pilot to ensure that the tactors are in proper position to tactually stimulate the pilot, which would be expensive.

The inventors have also recognized and appreciated that outfitting pilots with wearable tactors places a burden on the pilots. In order to use the wearable tactors, each pilot would need to carry, with him, the wearable article (e.g., vest, suit, etc.) comprising the tactors, which may be bulky and heavy, as well as connect the sensors in the wearable article to other hardware in the aircraft, which may take time. Such a burden is clearly undesirable and inconvenient.

The inventors have also recognized and appreciated that, in addition to or instead of tactors worn by the pilot, tactors physically coupled to the aircraft may be used to provide information to the pilot by tactually stimulating the pilot. In particular, the inventors have recognized that tactors physically coupled to the pilot seat may be used to provide information to the pilot by tactually stimulating the pilot. The inventors have also appreciated that, because multiple pilots may use the same seat, it may be less expensive to outfit a pilot seat with one or more tactors than to outfit each pilot with wearable tactors. The inventors have also recognized that outfitting a pilot seat with tactors may be less burdensome on pilots as they may not need to carry with them potentially bulky and heavy articles comprising wearable tactors (e.g., suits or vests) and/or need to connect them to the aircraft each time they wish to use them.

Some embodiments described herein address all of the above-described issues of conventional techniques of tactually presenting information to a pilot. However, not every embodiment addresses every one of these issues, and some embodiments may not address any of them. As such, it should be appreciated that the present invention is not limited to addressing all or any of the above-discussed issues of these conventional techniques for tactually presenting information to the pilot.

Accordingly, in some embodiments, information may be tactually presented to a pilot of an aircraft by controlling one or more tactors physically coupled to the pilot seat. Though it should be recognized that, in some embodiments, information may be tactually presented to the pilot by controlling one or more tactors physically coupled to the pilot seat and one or more other tactors. The one or more other tactors may be any suitable tactors and, for example, may be one or more tactors worn by the pilot.

A tactor may be physically coupled to any suitable portion of the seat. For example, as described in greater detail below, a seat may comprise a seating portion, a back portion, and/or one or more seatbelts. Accordingly, a tactor may be physically coupled to any one or more of these portions and, for example, may be physically coupled to the seating portion, to the back portion, to the one or more seatbelts, and/or to any other suitable part of the seat.

A tactor may be physically coupled to the pilot seat in any of numerous ways. For example, the tactor may be physically coupled to the pilot seat by being within the pilot seat such that the pilot seat comprises the tactor (e.g., a tactor may be inside the cushioning of the pilot seat). As another example, the tactor may be physically coupled to the pilot seat by being in direct physical contact with the pilot seat. As yet another example, a tactor may be physically coupled to the pilot seat by being in indirect physical contact with the pilot seat through one or more other objects that are in direct physical contact with the pilot seat (e.g., a tactor inside a cushion or seat cover attached to the pilot seat is in indirect contact with the pilot seat). A tactor may be physically coupled to the pilot seat either permanently or in a way that allows the tactor to be physically uncoupled from the pilot seat.

Accordingly, in some embodiments, one or more tactors may be physically coupled to a pilot seat to tactually present information to a pilot sitting in the pilot seat by relying on the pilot's sense of touch. The information tactually presented to the pilot may be any of numerous types of information including, but not limited to, any information that may be obtained by any of the aircraft's sensors and/or obtained by the aircraft by using any of the aircraft's communications devices.

In some embodiments, one or more pressure sensors may be physically coupled to a pilot seat. In turn, the tactor(s) physically coupled to the pilot seat may be configured to tactually present information to the pilot sitting in the pilot seat based at least in part on data obtained by the pressure sensor(s). The tactor(s) may be configured to present information to the pilot by using only a subset of the tactor(s), with the subset identified based on data obtained by the pressure sensor(s). For example, the subset of tactors may include tactors physically coupled to parts of the pilot seat to which the pilot's body may be applying pressure. Stimuli generated by such tactors may be felt by the pilot. As such, the manner in which information is tactually presented to the pilot may be adapted to the characteristics of the pilot's body and/or the way the pilot may be sitting in the pilot seat.

In some embodiments, information tactually presented to a pilot may comprise threat information related to one or more threats to the aircraft. Information related to a threat to the aircraft may be any suitable type of information. For example, information related to a threat to the aircraft may comprise information characterizing the threat (e.g., the location of the threat, one or more physical characteristics of the threat, level of danger to the aircraft that the threat poses, etc.). Such information is sometimes referred to as warning information. Additionally or alternatively, information tactually presented to the pilot may comprise information indicating one or more actions to be taken by the pilot in order to increase the likelihood of survivability of the aircraft in view of the threat. Such information is sometimes referred to as directive information.

A threat to an aircraft may be any threat that may put the aircraft in physical danger and/or in any risk of not completing the mission as planned. For example, threats may be enemy systems, enemy vehicles, ground troops, and/or artillery systems. Such threats may have weapon systems and/or may be equipped with multi-spectral sensors for obtaining information about detecting and tracking aircraft. For example, a threat may be equipped with an one or more passive sensors to obtain information about the aircraft by detecting emissions from the aircraft (e.g., an infrared (IR) sensor for detecting infrared energy emitted by the target vehicle), and/or one or more active sensors to obtain information about the aircraft by irradiating the aircraft with a radar for transmitting electromagnetic waves (e.g., radio waves) and detecting those waves that bounce back from the target vehicle (e.g., a radar (RF) sensor). As another example, threats may be physical obstacles to the aircraft. Physical obstacles may be any suitable obstacles and, for example, may be any manufactured structure (e.g., building, bridge, power lines, another aircraft, etc.) or a naturally occurring physical obstacle (e.g., ground, trees, mountains, etc.). Though, it should be recognized that these examples are only illustrative and not limiting as information about any other threat may be provided to the aircraft. Additionally, threats may be located at known or unknown locations, and may have known or unknown capabilities for gathering information about and/or attacking target vehicles.

It should be appreciated that the various aspects and concepts of the present invention described herein may be implemented in any of numerous ways, and are not limited to any particular implementation technique. Examples of specific implementations are described below for illustrative purposes only, but the aspects of the invention described herein are not limited to these illustrative implementations.

FIG. 1 shows an illustrative environment in which some embodiments of the present invention may operate. In particular, FIG. 1 shows an environment 100 in which pilot 102 may operate a vehicle (not shown). Environment 100 may be any suitable environment and, for example, may be an environment within the vehicle (e.g., the pilot may be operating the vehicle from within the vehicle) or an environment remote to the vehicle (e.g., the pilot may be operating the vehicle remotely). In other embodiments, environment 100 may be an environment for the pilot to train operating a vehicle and may be an environment in which the pilot may train by operating an actual vehicle remotely or a simulated vehicle (e.g., by using a flight simulator).

It should be appreciated that pilot 102 may be any suitable person. For example, pilot 102 may be a person who has previously operated a vehicle (either from within the vehicle or remotely from the vehicle), a person who is training to operate the vehicle (either from within the vehicle or remotely from the vehicle) or any other suitable person as aspects of the present invention are not limited in this respect.

As previously described, a vehicle may be any suitable aircraft such as an airplane or a helicopter. Though it should be recognized that aspects of the present invention are not so limited as the vehicle may be any other type of aircraft or another type of vehicle. Additional examples of vehicles include, but are not limited to, rockets, missiles, gliders, spacecraft, lighter-than-air craft, hovercraft, cars, trucks, motorcycles, tanks, heavy equipment, naval vessels, watercraft, submarines, etc. A vehicle may be manned or unmanned, and may be operated manually or automatically, or by a suitable combination of manual control and automatic control. Furthermore, a vehicle may be owned and/or operated by any suitable entity, such as a military entity, a commercial entity, or a private entity.

In environment 100, pilot 102 may be presented with any of numerous types of information including, but not limited to, navigational information, situational information, information about the vehicle, threat information about any threats and/or potential threats to the vehicle, and/or mission status information.

Information presented to pilot 102 may be obtained in any suitable way. For example, information may be obtained using one or more components of environment 100 configured to collect and disseminate information. For example, in some embodiments, environment 100 may receive input from one or more sensors 110 onboard the vehicle. Sensors 110 may obtain any of numerous types of information using any suitable passive and/or active sensing technologies, including, but not limited to, radar, IR, sonar, video image, laser, and acoustic sensing technologies. For instance, some sensors may be configured to sense operating conditions of the vehicle, such as latitude, longitude, altitude, heading, orientation, speed, and acceleration, and changes (and/or rates of changes) in any of such operating conditions. Some other sensors may sense environmental conditions, such as light, humidity, atmospheric pressure, wind speed, and wind direction. Yet some other sensors may provide information regarding one or more threats that may be present. For example, a target recognition sensor may provide information relating to threat type (e.g., a weapons system, another vehicle, an enemy sensor system, etc.), and a range sensor (e.g., radar or laser radar) may estimate a distance between the vehicle and a detected threat. Other types of sensors may also be suitable, as aspects of the present disclosure are not limited to the use of any particular type of sensors.

Additionally or alternatively, information presented to pilot 102 may be obtained by using one or more communication devices 112, which may be configured to receive and transmit information using any suitable communications technologies such as radio and microwave technologies. The communication devices 112 may allow the environment 100 (e.g., by using controller 108) to interact with a remote system, such as a command center or another vehicle, and may allow any suitable information (e.g., intelligence information and location information about one or more threats to the vehicle) to be obtained.

Regardless of how information presented to pilot 102 may be obtained, the information may be presented to pilot 102 using any one of numerous types of interfaces including one or more audio interfaces, one or more visual interfaces (e.g., by using display 106), and one or more tactile interfaces (e.g., by using pilot seat 104).

Information may be tactually presented to pilot 102 by using one or more tactors physically coupled to pilot seat 104. These tactor(s) may be controlled in any suitable way to tactually present information to pilot 102. In the illustrated embodiment, controller 108 may control the tactor(s) physically coupled to pilot seat 104 to produce one or more tactile stimuli in order to tactually present information to pilot 102. For example, controller 108 may control the tactor(s) based on any suitable information (e.g., situational awareness information, threat information, etc.) obtained from sensors 110 and/or communications devices 112. It should be appreciated that controller 108 may control the tactor(s) using any suitable communications medium and may, for example, control the tactor(s) via one or more wired connections, wirelessly, or any suitable combination thereof.

Controller 108 may be any suitable type of controller and may be implemented using hardware, software, or any suitable combination of hardware and software. As a non-limiting example, controller 108 may comprise one or more processors that may execute processor-executable instructions that cause the controller to control the tactor(s) to generate one or more stimuli.

It should be appreciated that in addition to one or more tactors physically coupled to pilot seat 104, information may be tactually presented to pilot 102 using one or more other tactors. These other tactors may be worn by the pilot and, for example, may be tactors physically coupled to a wearable article that the pilot may be wearing (e.g., helmet, gloves, pilot suit, wrist bands, and/or any other wearable article to which one or more tactors may be coupled in order to tactually stimulate the pilot). As another example, these other tactors may be physically coupled to any suitable component of environment 100, other than pilot seat 104, and, for example, may be physically coupled to a pilot stick (not shown).

Pilot seat 104 and the way in which one or more tactors physically coupled to the pilot seat may be used to tactually present information to a pilot sitting in pilot seat 104 are described in greater detail below with reference to FIGS. 2-4 below.

Figure 2:
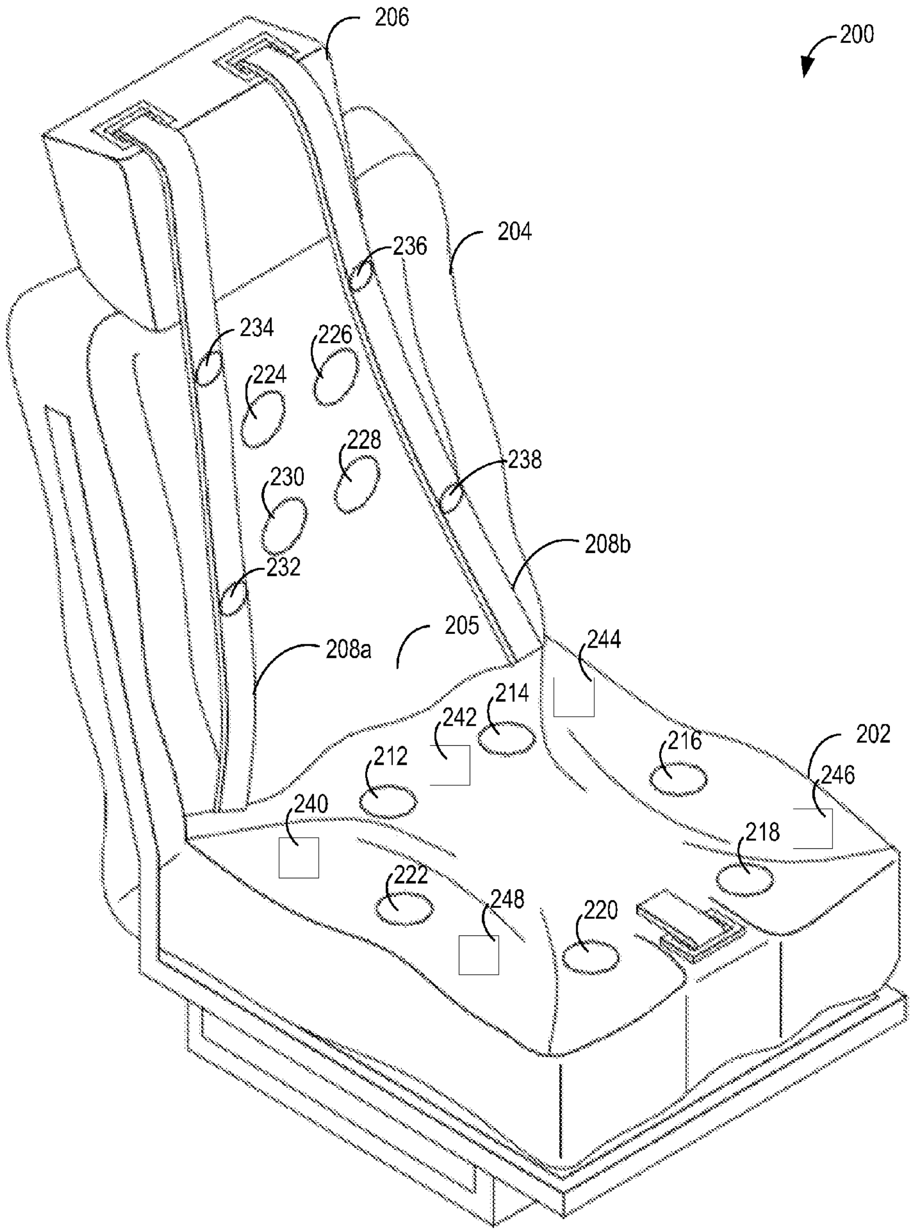
FIG. 2 shows an illustrative embodiment of a seat for tactile presentation of information to a pilot, in accordance with some embodiments.
Figure 3:
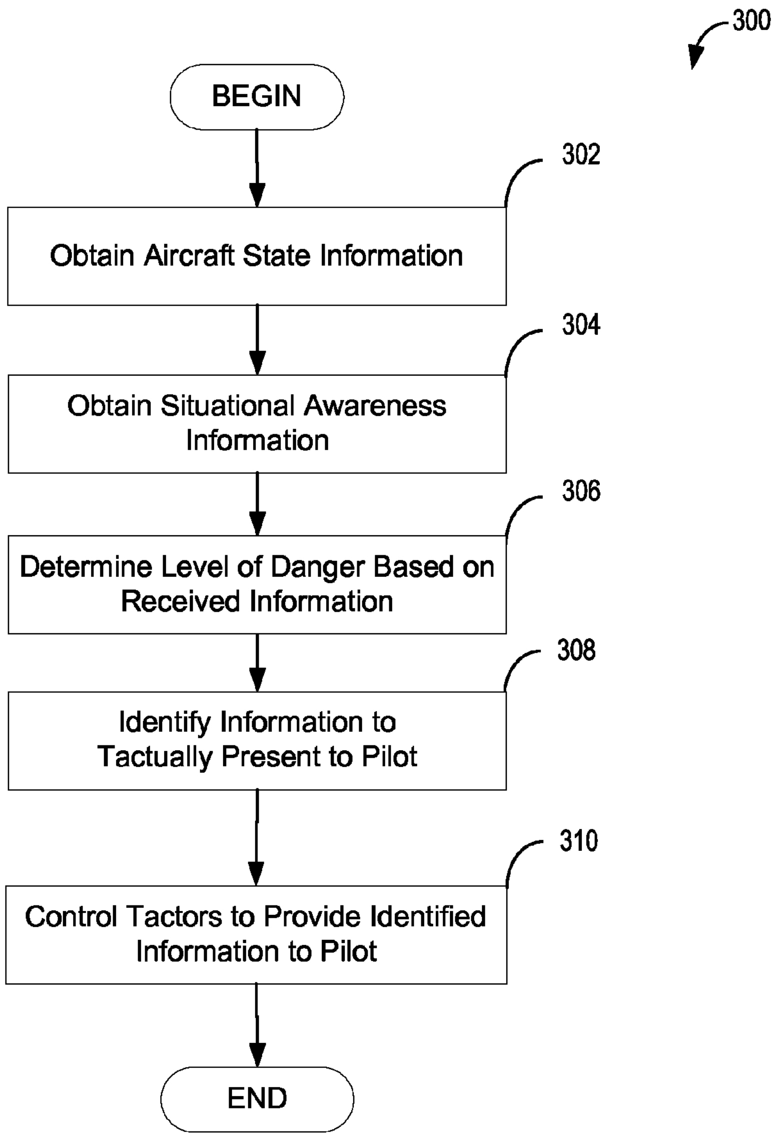
FIG. 3 is a flowchart of an illustrative process for tactile presentation of information to a pilot, in accordance with some embodiments.

FIG. 2. shows an illustrative embodiment of a pilot seat 200 that may be used for tactually presenting information to a pilot (e.g., pilot 104), in accordance with some embodiments. Pilot seat 200 may be used in any environment in which a pilot may operate a vehicle (e.g., environment 100). The pilot may operate a vehicle while sitting in pilot seat 200 and the pilot seat may be used to provide information to the pilot by tactually stimulating the pilot.

Pilot seat 200 may be any suitable pilot seat and may be configured in any suitable way. Pilot seat 200 may be an already-existing pilot seat adapted to tactually present information to a pilot and/or a pilot seat designed at least in part to tactually present information to the pilot. In the illustrated embodiment, pilot seat 200 comprises seating portion 202, back support portion 204 comprising lumbar region 205, head support portion 206, and seatbelts 208*a* and 208*b*. It should be recognized, however, that this embodiment is merely illustrative, as a pilot seat may be configured in any other suitable way (e.g., no head support portion distinct from the back support portion, different type of seatbelt mechanism, etc.).

Pilot seat 200 may be physically coupled to one or more devices (tactors) configured to provide tactual stimulation. The tactor(s) may be configured to tactually stimulate a pilot sitting in pilot seat 200 in order to present information to the pilot. The tactor(s) may be configured to tactually stimulate the pilot in response to one or more control signals or commands provided by a controller (e.g., controller 108). For example, the tactor(s) may be configured to tactually present information indicating a threat to the aircraft to the pilot. Though, it should be recognized that the tactor(s) may be configured to present to the pilot any of the other types of information previously described (navigation information, situational awareness information, etc.).

Pilot seat 200 may be adjustable for any suitable purpose and may be adjusted in any of numerous ways. Pilot seat 200 may be adjusted for a particular pilot, at least in part, to tactually present information to the pilot. Adjusting the pilot seat may position one or more tactor(s) physically coupled to the pilot seat to more effectively tactually stimulate the pilot. For example, back portion 204 may be reclined or brought closer to or away from the pilot. As another example, lumbar region 205 may be brought closer to or away from the pilot. As yet another example, seating portion 202 may be widened or thinned. It should be noted that the above examples are illustrative and that pilot seat 200 may be adjusted in any of numerous other ways (e.g., seatbelt adjustments, etc.).

A tactor may be physically coupled to any suitable part or parts of pilot seat 200 in any suitable way. A tactor may be physically coupled to a seating portion of the pilot seat and/or to any other portion of the pilot seat such as a back support portion, a seatbelt, a head support portion, arm support portion, etc. In the illustrated embodiment, for example, tactors 212, 214, 216, 218, 220, and 222 are physically coupled to seating portion 202. Tactors 224, 226, 228, and 230 are physically coupled to back support portion 204 (in other embodiments, one or more tactors may be physically coupled to lumbar region 205). Tactors 232, 234, 236, and 238 are physically coupled to seatbelts 208*a* and 208*b*. Though, it should be recognized that the embodiment illustrated in FIG. 2 is a non-limiting illustration and, as such, neither limits the number of tactors physically coupled to a pilot seat or any portion thereof nor limits where the tactors are physically coupled to the pilot seat. Indeed, any suitable number of tactors (e.g., at least one tactor, at least two tactors, at least four tactors, at least six tactors, at least 10 tactors, etc.) may be physically coupled to any particular portion of the seat (e.g., seating portion 202, back support portion 204, seatbelts 208*a* and 208*b*, etc.). Moreover, a portion of the pilot seat may not be physically coupled to any tactors (e.g., no tactors are physically coupled to head support portion 206 in the illustrated embodiment).

One or more tactors physically coupled to a portion of pilot seat 200 may be arranged in any suitable way with respect to one another. The tactors may be arranged in a pattern designed to effectively present information to a pilot via tactual stimulation. The pattern may be any suitable pattern and may depend on the type of pilot seat used and the type of information intended to be tactually presented to the pilot by using the tactors. In the illustrated embodiment, for example, tactors 212-222 are arranged on the perimeter of seating portion 202, but they may be arranged in any other suitable way with respect to one another and the seating portion.

A tactor may be any of numerous types of devices configured to provide tactile stimulation and may operate based on any suitable technology. For example, a tactor may be an electrical tactor, a pneumatic tactor, a vibro-mechanical tactor (sometimes termed a rotary-inertia tactor), a linear actuator tactor, or a piston-based tactor, which vibrates when a piston pushes on a membrane. Though, it should be recognized that any of these or other types of tactors may be employed to present information to a pilot by tactually stimulating the pilot. It should also be recognized that while, in some instances, all tactors physically coupled to the pilot seat may be the same type of tactor, in other instances, the tactors physically coupled to the seat may include at least two different types of tactors.

A tactor may be characterized by its response time to a command to provide one or more tactual stimuli. In some embodiments, tactors that have a quick response time (e.g., below a predetermined threshold) may be employed. For example, the time from receipt, by a tactor, of a command to provide one or more stimuli to the time that the tactor provides the one or more stimuli may be a second or less, a fifth of a second or less, a tenth of a second or less, a hundredth of a second or less, etc.

The inventors have recognized that in an environment where information may need to be presented to a pilot with minimal delay, it may be advantageous to utilize tactors with quick response times. Accordingly, in some embodiments, one or more piston-based tactors or any other tactors with quick response times may be used.

A tactor may be controlled to generate a stimulus having any of numerous different intensities. For example, a tactor may be controlled to generate a stimulus having one of a discrete set of intensities (e.g., using low-level, medium-level, high-level intensities). Additionally or alternatively, a tactor may be controlled to generate a stimulus having any intensity in a continuous range of intensities.

A tactor may be configured to generate a series of at least two stimuli and, as such, may be controlled to generate these multiple stimuli in any suitable way. For example, each stimulus in the series may have any suitable intensity. The stimuli may be generated at a fixed frequency (i.e., essentially equal amounts of time elapse between consecutive stimuli). The frequency may be a high frequency (e.g., generate a stimulus every quarter second), a low frequency (generate a stimulus every five seconds), or any other suitable frequency as aspects of the present invention are not limited in this respect. Alternatively, a tactor may be controlled to generate stimuli at unequal amounts of time elapsing between consecutive stimuli.

Accordingly, a tactor may be controlled to generate a series of stimuli using any suitable intensities and frequencies. For example, a tactor may be controlled to generate a series of low-intensity stimuli at a low, a medium, or a high frequency. As another example, a tactor may be controlled to generate a series of high-intensity stimuli at a low, a medium, or a high frequency. Moreover, each tactor physically coupled to pilot seat 200 may be controlled to produce the same stimuli as other tactors (e.g., all tactors in seating portion 200 produce low-frequency, high-intensity stimuli) or may be controlled to produce different stimuli from other tactors. As such, the tactors coupled to pilot seat 200 may be controlled to generate complex patterns of stimuli in order to tactually present information to the pilot.

Additionally, in some embodiments, one or more pressure sensors may be physically coupled to a pilot seat. Each pressure sensor may be configured to sense an amount of pressure being applied to the pilot seat by the pilot sitting in the seat. The amount of pressure being applied may depend on any of numerous factors including, but not limited to, characteristics of the pilot's body (e.g., the pilot's weight, size, build, etc.) and the way in which the pilot may be sitting in the pilot seat. For example, a pilot may be leaning back in the pilot seat such that his body may be applying pressure to the back portion of the pilot seat. As another example, a pilot may be leaning to one side such that his body may be applying pressure to the corresponding side of the seating portion of the pilot seat. As yet another example, the pilot may be using one or more seatbelts in such a way (e.g., leaning on seatbelt(s) or sitting with seatbelt(s) tightly fastened) that his body may be applying pressure to the seatbelt(s).

Any data obtained by one or more pressure sensors may be used to determine how to control the one or more tactors in order to tactually present information to the pilot. In some embodiments, the tactor(s) may be configured to present information to the pilot by using only a subset of the tactor(s), with the subset identified based on data obtained by the pressure sensor(s). The subset of tactors may include tactors physically coupled to parts of the pilot seat to which the pilot may be applying pressure. For example, if data obtained by the pressure sensor(s) indicates that the pilot is applying pressure to the back portion of the pilot's seat, one or more tactors physically coupled to the back portion of the pilot seat may be used to present information to the pilot by tactually stimulating the pilot. As another example, if data obtained by the pressure sensor(s) indicates that the pilot is applying pressure to a part of the seating portion of the pilot seat, one or more tactors physically coupled to that part of the seating portion of the pilot seat may be used to present information to the pilot by tactually stimulating the pilot. As yet another example, tactors physically coupled to a part of the pilot seat to which the pilot may not be applying pressure may not be used to present information to the pilot by tactually stimulating the pilot.

Accordingly, by using data obtained by one or more pressure sensors physically coupled to the pilot seat, the manner in which information is tactually presented to the pilot may be adapted to the characteristics of the pilot's body and/or the way the pilot may be sitting in the pilot seat. Though, it should be recognized, that such adaptation may be done in any suitable way and is not limited to using only a subset of the tactors to tactually stimulate the pilot. For example, the frequency or frequencies at which one or more tactors are controlled to stimulate the pilot may depend on data obtained by the pressure sensor(s). As another example, the amplitude or amplitudes of the stimuli generated by the pressure sensors(s) may depend on data obtained by the pressure sensors. Many other examples will be apparent to those skilled in the art.

It should also be appreciated that a pilot may reposition himself one or multiple times while sitting in the pilot seat. In this circumstance, data obtained by the pressure sensor(s) may be used to adjust the way in which tactors, physically coupled to the pilot seat, may be used to present information to the pilot and, as such, adapt to the way the pilot may be sitting.

Similar to tactors, the pressure sensor(s) may be physically coupled to any suitable portion of the pilot seat (e.g., seating portion, back support portion, seatbelts, etc.), any suitable number of pressure sensors may be used, and they may be arranged in any suitable way with respect to one another and the pilot seat. For example, in the illustrated embodiment, pressure sensors 240, 242, 244, 246, and 248 are physically coupled to seating portion 204.

Pilot seat 200 may be used to tactually present information to a pilot sitting in the pilot seat. This may be done any of numerous ways as described below with reference to FIG. 3, which is a flowchart of an illustrative process 300 for tactile presentation of information to a pilot, in accordance with some embodiments. Process 300 may be performed, for example, by using components of environment 100, described with reference to FIG. 1, such as a pilot seat (e.g., pilot seat 104, pilot seat 200, etc.) and a controller (e.g., controller 108).

Process 300 begins at act 302, where information about the state of the aircraft may be obtained. Information about the state of the aircraft may include, but is not limited to, information about the location of the aircraft. For example, information about the state of the aircraft may comprise the orientation of the aircraft, altitude of the aircraft, yaw of the aircraft, pitch of the aircraft, and/or roll of the aircraft. Such information may be obtained via any of numerous sensors (e.g., sensors 110, GPS devices, internal navigation system devices, altimeter, etc.). The above examples are merely illustrative as any other information about the state of the aircraft (e.g., information about any onboard systems) may be obtained in act 302. Information about the state of the aircraft may be received by any suitable component and, for example, may be received by controller 108.

Process 300 next proceeds to act 304 where situational awareness information may be obtained. Situational awareness information may comprise any information relating to an actual or hypothetical scenario in which the vehicle may be operating. Situational awareness information may include, but is not limited to, any suitable information about the environment of the aircraft, one or more threats to the aircraft (e.g., any of the previously-discussed types of threats including, but not limited to, man-made structures and naturally-occurring obstacles), information about the aircraft's mission (e.g., stage of the mission), etc. Situational awareness information may comprise information that may be useful in selecting an appropriate action in the scenario. For example, the situational data may include information relating to the vehicle's own capabilities, such as the ability to maneuver in a certain way under certain conditions, to detect a threat, or to attack a threat. As another example, the situational data may include information relating to environmental conditions, such as weather and terrain conditions and locations and capabilities of friendly entities. Other types of situational data may also be suitable, as aspects of the present disclosure are not limited to the use of any particular types of situational awareness information. Situational awareness information may be obtained in any suitable way and, for example, may be obtained using any suitable sensors (e.g., sensors 110) or communications devices (e.g., communications devices 112).

Information about a threat to the aircraft may include any suitable information about that threat including, but not limited to, the location of the threat or one or more characteristics of the threat (e.g., the type of threat, indicating that the threat is moving or stationary, danger level posed by the threat, etc.). As one non-limiting example, information about the threat may indicate that there may be an object near the aircraft (e.g., one or more other aircraft, the ground, a building, etc.) and/or an obstacle in the path of the aircraft (e.g., power lines, building, etc.). The information about a threat may further indicate the distance of the aircraft from threat (e.g., the object and/or obstacle). Additionally or alternatively, the information may indicate an amount of time until the aircraft may come into contact with (e.g., collide) with the threat (e.g., the object and/or obstacle).

Next, process 300 proceeds to act 306, where any of the information received in acts 302-304 may be analyzed to determine a level of danger to the aircraft. The level of danger to the aircraft may be any of numerous levels of danger, such as a low, a medium, or a high level of danger, and may be determined in any suitable way. In some embodiments, the level of danger may be determined based on at least one of proximity of a threat to the aircraft, which may be determined based on the state of the aircraft and the situational information, the current mission stage, and/or the type of threat. For example, the level of danger associated with a threat to the aircraft may be high if the threat is close to the aircraft, but lower if that threat is further away. As another example, an enemy weapon system may present a higher level of danger to the aircraft than an enemy sensor system. More examples are provided below with reference to FIGS. 4A and 4B.

Next, process 300 proceeds to act 308, where information to be tactually presented to the pilot may be identified. This may be done in any suitable way. The information identified as information to be tactually presented to the pilot may comprise any of the previously discussed types of information and may comprise threat information about one or more threats obtained in acts 302-304 of process 300. The information to be tactually presented to the pilot may comprise a recommendation for action and/or any other type communication to the pilot. For example, information to be tactually presented to the pilot may comprise information to make the pilot aware of the threat situation (e.g., an obstacle is 'out there'), information indicating for the pilot to plan ahead to avoid a threat (e.g., obstacle in aircraft's path), information indicating for the pilot to plan for immediate action (e.g., 30 seconds to impact), a recommendation for pilot to take a specific action (e.g., change heading, maneuver aircraft in a particular way).

The information to be tactually presented to the pilot may depend on the danger level determined in act 306. For example, in some embodiments, information may be tactually presented to the pilot if the danger level is determined to be greater than a predetermined threshold (e.g., a high level of danger). On the other hand, no information may be tactually presented to the pilot if the danger level to the aircraft is determined to be less than a predetermined threshold (e.g., low level of danger).

After information to be tactually presented to the pilot is identified in act 308, process 300 proceeds to act 310, where the information identified in act 308 is tactually presented to the pilot. As previously mentioned, the information may be presented to the pilot by controlling one or more tactors to stimulate the pilot. Also, as previously mentioned, the tactor (s) may be physically coupled to the pilot seat and, additionally, one or more other tactors, not physically coupled to the pilot seat, may be employed.

The information may be tactually presented to the pilot, in act 310, by controlling the tactor(s) to produce one or more coded stimulus patterns. A stimulus pattern may comprise one or more stimuli produced by any subset of the tactors and may be a pattern indicating specific information to the pilot. For example, stimuli produced by a tactor or tactors in the seatbelts of the pilot seat may provide the pilot with aerial warnings and cueing information. As another example, stimuli produced by a tactor or tactors in the seating portion of the pilot seat may provide the pilot with information about the attitude and altitude of the aircraft and/or one or more threats to the aircraft. As yet another example, stimuli produced by a tactor or tactors in the back portion of the pilot seat may also provide the pilot with aerial warning and cueing information. It should be recognized, that any suitable stimulus pattern may be used to indicate any of numerous types of information to the pilot as aspects of the present invention are not limited in this respect. As such, in some embodiments, a pilot may be able to recognize what information is associated with what stimulus pattern or patterns and, in some cases, may even be able to configure the system to present various types of information using the stimulus pattern or patterns specified by the pilot.

In some embodiments, tactually presenting information to a pilot may comprise controlling one or more tactors to produce one or more stimuli such that the one or more produced stimuli may provide a pilot with information about one or more threats to the aircraft. As such, warning information may be presented to a pilot. For instance, the one or more stimuli may provide the pilot with information about the location the threat. As a specific example, different stimulus patterns may be used to indicate the distance of the threat to the aircraft. As another example, the one or more stimuli may provide the pilot with information about the nature of the threat. In this case, different stimulus patterns may be used to distinguish one type of threat, such as a manufactured threat (e.g., another aircraft, a power line, etc.), from another type of threat, such as a naturally occurring obstacle (e.g., ground, mountains, etc.). Though, it should be recognized that these are non-limiting and illustrative examples, and any other type of information about one or more threats to the aircraft may be tactually presented to the pilot. As one example, a pilot may be tactually notified that the danger level associated with a threat may have changed. More examples are provided with reference to FIGS. 4A and 4B below.

In some embodiments, tactually presenting information to a pilot, about one or more threats to the aircraft, may comprise controlling one or more tactors to produce one or more stimuli indicating at least one or more actions for the pilot to perform in response to the threat(s). As such, directive information may be presented to a pilot. For example, the one or more stimuli may indicate that the pilot should maneuver the aircraft and, in some instances, may even indicate the type of maneuver that the pilot should perform. As a specific example, the one or more stimuli may indicate that the pilot should maneuver the aircraft to avoid an obstacle in the aircraft's path and, in particular, may indicate that the pilot may maneuver the aircraft in a particular direction (e.g., by indicating said direction using a subset of the tactors in the seating portion of the pilot seat or any other suitable set of tactors). Though, it should be recognized that the tactor(s) may be controlled to indicate any other suitable action for the pilot to perform in response to the threat(s) to the aircraft, as aspects of the present invention are not limited in this respect. It should be appreciated that any suitable tactor may be used to provide directive information including tactors physically coupled to the pilot seat and/or tactors provided as part of a wearable article (e.g., gloves). Though, it should also be appreciated, that different tactors (e.g., tactors provided as part a wearable article and tactors physically coupled to a pilot seat) may be configured to provide different types of information in any suitable way.

In act 310, tactors may be controlled to produce one or more stimuli to tactually present information to the pilot based on the level of danger determined in act 306. In some embodiments, the stimulus pattern produced by the tactors, the intensity of the stimuli, and/or frequency of the stimuli may depend on the determined level of danger. For example, the intensity and/or frequency of stimuli may increase with increasing levels of danger to the aircraft. As another example, a different stimulus pattern (e.g., engaging more tactors, less tactors, and/or different tactors) may be used for different danger levels.

Regardless of what information is tactually presented to the pilot in act 310 and the manner in which it is presented to the pilot, process 300 completes after act 310. Though, it should be recognized that process 300 is merely exemplary and that many variations of process 300 are possible. For example, although in the illustrated embodiment, process 300 is shown to complete after act 310, in other embodiments, process 300 may loop back to acts 302-304 to continue obtaining information about the aircraft and its environment in order to continue to present the pilot with information about any threats to the aircraft by tactually stimulating the pilot.

Figure 4B:
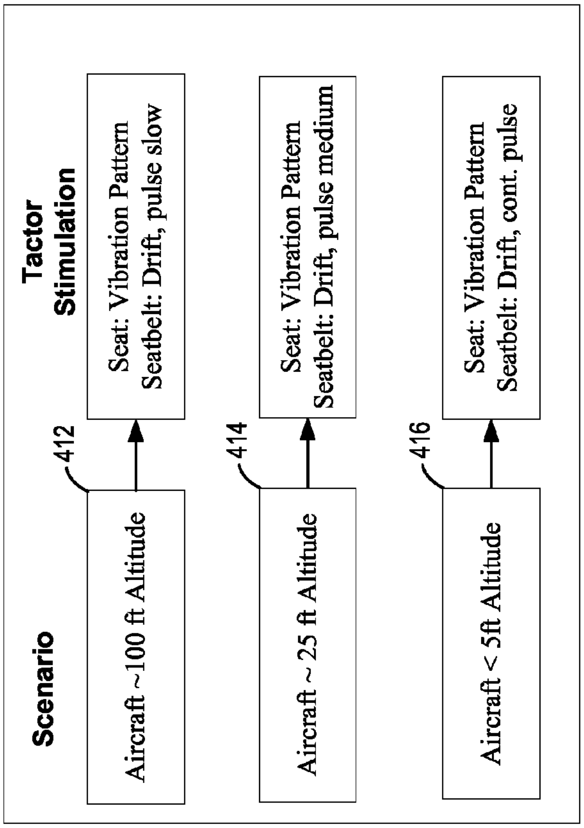
FIGS. 4A and 4B each show an illustrative scenario in which information is provided to a pilot using tactile stimulation, in accordance with some embodiments.
Figure 4A:
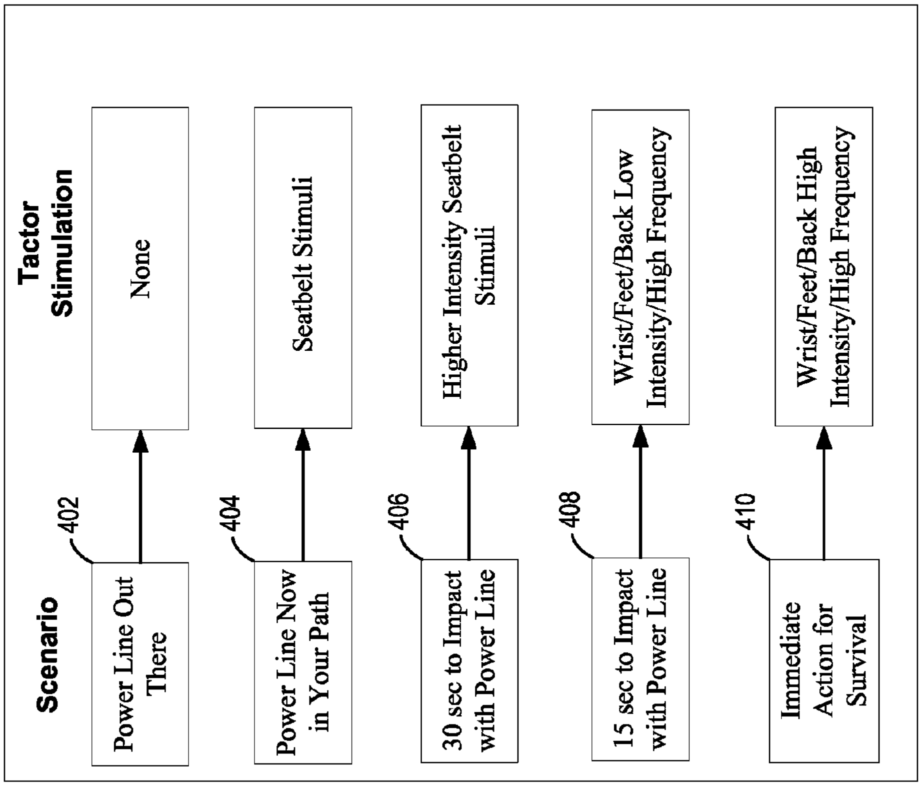

FIGS. 4A and 4B each show a number of non-limiting, illustrative scenarios in which information is provided to a pilot using tactile stimulation, in accordance with some embodiments of the present invention. FIG. 4A illustrates a number of scenarios (scenarios 402, 404, 406, 408, and 410) in which a collision threat (a power line, but may be any suitable collision threat) near an aircraft poses a threat to the aircraft; in each scenario information related to the threat is tactually presented to the pilot. Though, it should be recognized that the following scenarios are non-limiting illustrative examples and that many variations are possible.

In scenario 402, information about the state of the aircraft and situational awareness information (collected e.g., in acts 302 and 304 of process 300) is used to identify that there is a power line within a certain distance of the aircraft. However, based on the estimated distance between the aircraft and the power line, the level of danger is determined to be low (e.g., in act 306 of process 300). As a result, it may be determined (e.g., in act 308 of process 300) to provide information to the pilot to make him aware of the presence of the power line. However, because the determined level of danger is low, the tactors are controlled (e.g., in act 310 of process 300) to provide no stimuli to the pilot.

In scenario 404, information about the state of the aircraft and situational awareness information (collected e.g., in acts 302 and 304) is used to identify that a power line is in the path of the aircraft. As a result, the level of danger is determined to be low/medium (e.g., in act 306). As a result, it may be determined (e.g., in act 308) to inform the pilot that he should plan ahead to avoid a subsequent collision. Accordingly, one or more coded stimuli are provided to the pilot (e.g., in act 310) by using one or more tactors in the seatbelt of the pilot seat. Though, it should be recognized that this information may be tactually presented to the pilot in any other suitable way (e.g., using other tactors).

In scenario 406, information about the state of the aircraft and situational awareness information (collected e.g., in acts 302 and 304) is used to identify that the aircraft may collide with a power line in 30 seconds. As a result, the level of danger is determined to be medium (e.g., in act 306). As a result, it may be determined (e.g., in act 308) to inform the pilot that he should plan for immediate action in order to avoid a collision. Accordingly, one or more coded stimuli are provided to the pilot (e.g., in act 310) by using one or more tactors in the seatbelt of the pilot seat, but using a higher intensity than in scenario 404 due to an elevated level of danger. Though, it should be recognized that this information may be tactually presented to the pilot in any other suitable way (e.g., using other tactors).

In scenario 408, information about the state of the aircraft and situational awareness information (collected e.g., in acts 302 and 304) is used to identify that the aircraft may collide with a power line in 15 seconds. As a result, the level of danger is determined to be medium/high (e.g., in act 306). As a result, it may be determined (e.g., in act 308) to inform the pilot that he should take action and maneuver the plane to change its heading. Accordingly, one or more coded stimuli are provided to the pilot (e.g., in act 310) by using one or more tactors to provide low-intensity and high-frequency stimuli to the pilot's wrists (e.g., using gloves), feet and back. Though, it should be recognized that this information may be tactually presented to the pilot in any other suitable way (e.g., using other tactors).

In scenario 410, information about the state of the aircraft and situational awareness information (collected e.g., in acts 302 and 304) is used to identify that the aircraft may collide with a power line, unless immediate action is taken. As a result, the level of danger is determined to be high (e.g., in act 306). As a result, it may be determined (e.g., in act 308) to inform the pilot that he should take immediate action and maneuver the plane to change its heading. Accordingly, one or more coded stimuli are provided to the pilot (e.g., in act 310) by using one or more tactors to provide high-intensity and high-frequency stimuli to the pilot's wrists, feet and back. Though, it should be recognized that this information may be tactually presented to the pilot in any other suitable way (e.g., using other tactors). Scenarios 402-410 may be viewed as a sequence of scenarios occurring one after the other. As such, information indicating the transition from a scenario associated with one danger level to another scenario associated with another danger level may be tactually presented to the pilot.

FIG. 4B illustrates a number of scenarios (scenarios 412, 414, 416) in which a collision threat (with the ground, but may be any suitable collision threat) poses a threat to a hovering aircraft (e.g., helicopter); in each scenario information related to the threat is tactually presented to the pilot. Though, it should be recognized that the following scenarios are non-limiting illustrative examples and that many variations are possible.

In scenario 412, information about the state of the aircraft and situational awareness information (collected e.g., in acts 302 and 304) is used to identify that the aircraft's altitude is approximately 100 feet. As a result, the level of danger is determined to be medium (e.g., in act 306). As a result, it may be determined (e.g., in act 308) to warn the pilot. Accordingly, one or more coded stimuli are provided to the pilot (e.g., in act 310) by using one or more tactors to provide a vibration pattern in the seat and a slowly drifting pulse pattern in the seat belt. Though, it should be recognized that this information may be tactually presented to the pilot in any other suitable way (e.g., using other tactors).

In scenario 414, information about the state of the aircraft and situational awareness information (collected e.g., in acts 302 and 304) is used to identify that the aircraft's altitude is approximately 25 feet. As a result, the level of danger is determined to be medium/high (e.g., in act 306). As a result, it may be determined (e.g., in act 308) to inform the pilot to take pre-emptive action. Accordingly, one or more coded stimuli are provided to the pilot (e.g., in act 310) by using one or more tactors to provide a vibration pattern in the seat and a faster drifting pulse pattern in the seat belt. Though, it should be recognized that this information may be tactually presented to the pilot in any other suitable way (e.g., using other tactors).

In scenario 416, information about the state of the aircraft and situational awareness information (collected e.g., in acts 302 and 304) is used to identify that the aircraft's altitude is less than 5 feet. As a result, the level of danger is determined to be high (e.g., in act 306). As a result, it may be determined (e.g., in act 308) to inform the pilot to take immediate action to avoid a collision with the ground. Accordingly, one or more coded stimuli are provided to the pilot (e.g., in act 310) by using one or more tactors to provide a vibration pattern in the seat and an even faster drifting pulse pattern in the seat belt. Though, it should be recognized that this information may be tactually presented to the pilot in any other suitable way (e.g., using other tactors).

Figure 5:
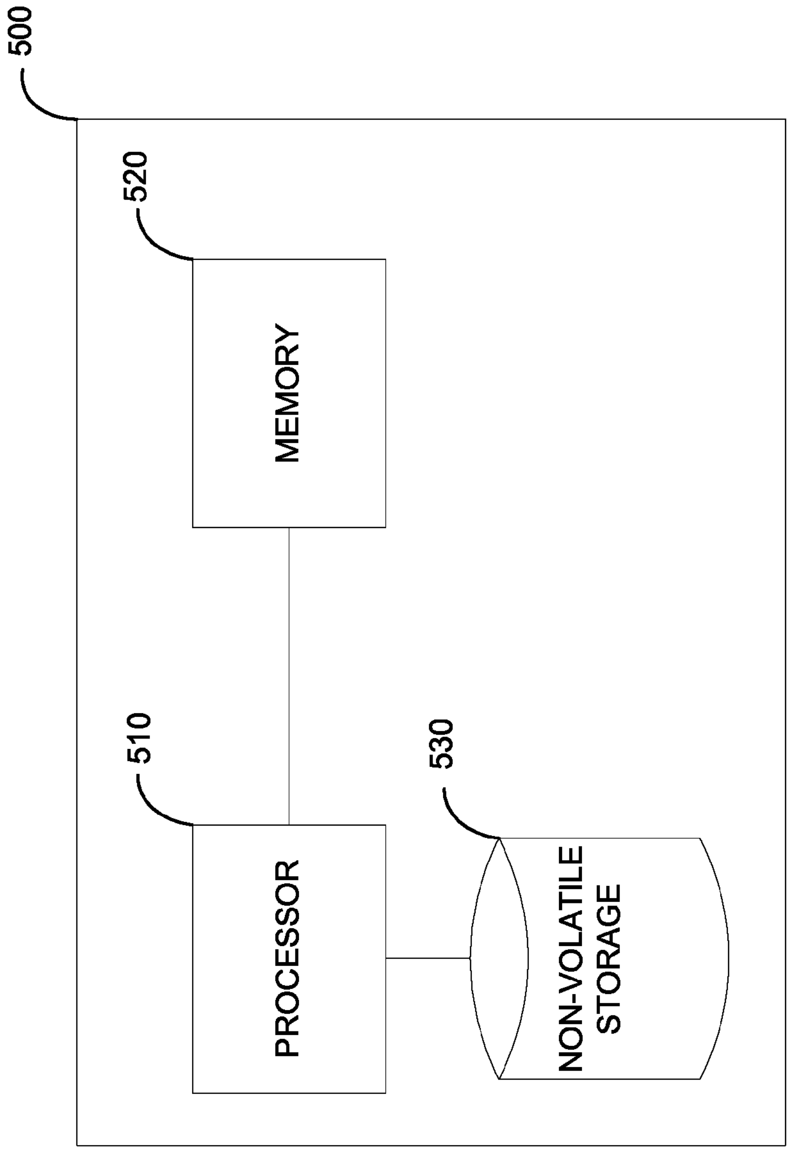
FIG. 5. is a block diagram of an illustrative computer system that may be used in implementing aspects of the present invention.

An illustrative implementation of a computer system 500 that may be used in connection with any of the embodiments of the invention described herein is shown in FIG. 5. The computer system 500 may include at least one processor 510 and one or more articles of manufacture that comprise non-transitory computer-readable storage media (e.g., memory 520 and at least one non-volatile storage medium 530). The processor 510 may control writing data to and reading data from the memory 520 and the non-volatile storage medium 530 in any suitable manner, as the aspects of the invention described herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples (see e.g., FIG. 3) has been provided. The acts performed as part of each method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for tactile presentation of threat information to a pilot of an aircraft, the method comprising:

identifying, based on data obtained by at least one pressure sensor configured to sense an amount of pressure applied to a pilot seat in the aircraft, a plurality of tactors to use for tactually presenting the threat information to the pilot; and tactually presenting the threat information to the pilot by controlling the identified plurality of tactors to produce one or more tactile stimuli based on situational awareness information, wherein tactors in the plurality of tactors are physically coupled to the pilot seat in the aircraft and the threat information is indicative of a threat to the aircraft.

2. The method of claim 1, wherein controlling the identified plurality of tactors based on the situational awareness information comprises determining a level of danger to the aircraft based at least in part on the situational awareness information.

3. The method of claim 2, wherein controlling the identified plurality of tactors further comprises controlling the identified plurality of tactors to produce one or more tactile stimuli whose intensity and/or frequency depends on the determined level of danger.

4. The method of claim 1, wherein tactually presenting the threat information to the pilot comprises tactually presenting information characterizing the threat to the aircraft.

5. The method of claim 4, wherein the information characterizing the threat to the aircraft comprises information indicative of a location of the threat to the aircraft and controlling the identified plurality of tactors comprises:

controlling the identified plurality of tactors to produce the one or more tactile stimuli such that the one or more produced stimuli are indicative of the location of the threat.

6. The method of claim 1, wherein tactually presenting the threat information to the pilot comprises tactually presenting at least one action for the pilot to perform in response to the threat to the aircraft.

7. The method of claim 6, wherein the at least one action for the pilot to perform comprises maneuvering the aircraft and controlling the identified plurality of tactors comprises:

controlling the identified plurality of tactors to produce the one or more tactile stimuli such that the one or more produced stimuli are indicative of one or more maneuvers for the pilot to perform in maneuvering the aircraft.

8. The method of claim 1, wherein the threat to the aircraft is a threat of collision.

9. The method of claim 1, wherein the identified plurality of tactors is a subset of a set of tactors physically coupled to the pilot seat.

10. The method of claim 1, wherein the identified plurality of tactors is a subset of a set of tactors physically coupled to the pilot seat.

11. A system for tactile presentation of threat information to a pilot of an aircraft, the threat information indicative of a threat to the aircraft, the system comprising:

a pilot seat;

a plurality of tactors physically coupled to the pilot seat;

at least one pressure sensor configured to sense an amount of pressure applied to the pilot seat; and a controller configured to:

identify, based on data obtained by the at least one pressure sensor, a plurality of tactors to use for tactually presenting the threat information to the pilot; and control the identified plurality of tactors to tactually present the threat information to the pilot by producing one or more tactile stimuli based on situational awareness information.

12. The system of claim 11, wherein the threat information comprises information indicative of a location of the threat to the aircraft and wherein the controller is configured to control the identified plurality of tactors by:

controlling the identified plurality of tactors to produce the one or more tactile stimuli such that the one or more produced stimuli are indicative of the location of the threat.

13. The system of claim 11, wherein the controller is configured to control the identified plurality of tactors to tactually present the threat information to the pilot by:

controlling the identified plurality of tactors to tactually present at least one action for the pilot to take in response to the threat to the aircraft.

14. The system of claim 13, wherein the at least one action for the pilot to take comprises maneuvering the aircraft and the controller is further configured to control the plurality of tactors by:

controlling the identified plurality of tactors to produce the one or more tactile stimuli such that the one or more produced stimuli are indicative of one or more maneuvers for the pilot to perform in maneuvering the aircraft.

15. The system of claim 11, wherein the pilot seat comprises a back portion and the back portion is physically coupled to at least one tactor in the identified plurality of tactors.

16. A pilot seat in an aircraft, the pilot seat comprising:

a plurality of tactors;

a seating portion; and at least one pressure sensor physically coupled to the seating portion, the at least one pressure sensor configured to sense an amount of pressure applied to the pilot seat;

wherein the plurality of tactors are configured to tactually present information to a pilot of the aircraft by producing one or more tactile stimuli based at least in part on data obtained by the at least one pressure sensor.

17. The pilot seat of claim 16, further comprising:

at least one seatbelt, wherein at least a first tactor in the plurality of tactors is physically coupled to the at least one seatbelt.

18. The pilot seat of claim 16, further comprising a back support portion comprising a lumbar portion wherein:

the lumbar portion comprises at least a second tactor in the plurality of tactors.

19. The pilot seat of claim 16, wherein the plurality of tactors are configured to tactually present information to the pilot by tactually presenting threat information using only a subset of tactors in the plurality of tactors, wherein the subset of tactors is identified based at least in part on the data obtained by the at least one pressure sensor.

20. The pilot seat of claim 16, wherein the data obtained by the at least one pressure sensor indicates an area of the pilot seat to which the pilot's body is applying pressure.

* * * * *